US008193113B2

(12) United States Patent
Soloveichik et al.

(10) Patent No.: US 8,193,113 B2
(45) Date of Patent: Jun. 5, 2012

(54) HYDROGEN STORAGE MATERIAL AND RELATED PROCESSES

(75) Inventors: Grigorii Lev Soloveichik, Latham, NY (US); Matthew John Andrus, Cape Canaveral, FL (US)

(73) Assignee: General Electric Company, Niskayuna, NY (US)

( * ) Notice: Subject to any disclaimer, the term of this patent is extended or adjusted under 35 U.S.C. 154(b) by 24 days.

(21) Appl. No.: 12/794,857

(22) Filed: Jun. 7, 2010

(65) Prior Publication Data
US 2010/0240528 A1 Sep. 23, 2010

Related U.S. Application Data

(63) Continuation of application No. 12/031,336, filed on Feb. 14, 2008, now Pat. No. 7,754,641.

(51) Int. Cl.
*B01J 21/02* (2006.01)

(52) U.S. Cl. ........ 502/202; 502/114; 502/150; 502/170; 502/152; 423/286; 423/295; 423/644; 423/645; 423/646; 423/647; 252/389.4; 252/188.26

(58) Field of Classification Search ............... 502/202, 502/151, 102, 170; 252/389.4, 188.26; 423/644–647, 648.1, 658.2, 286, 289, 295
See application file for complete search history.

(56) References Cited

U.S. PATENT DOCUMENTS

| | | | |
|---|---|---|---|
| 3,387,949 A | 6/1968 | Snyder | |
| 3,478,008 A * | 11/1969 | Ledbetter | ...................... 526/119 |
| 4,128,567 A | 12/1978 | Corbellini et al. | |
| 4,512,966 A | 4/1985 | Nelson | |
| 6,106,801 A | 8/2000 | Bogdanovic et al. | |
| 6,187,712 B1 * | 2/2001 | Peterson | ....................... 502/152 |
| 2003/0026757 A1 | 2/2003 | Pecharsky et al. | |
| 2003/0143154 A1 | 7/2003 | Gross et al. | |
| 2003/0165423 A1 | 9/2003 | Gross et al. | |
| 2004/0105805 A1 | 6/2004 | Zidan | |
| 2005/0054525 A1 | 3/2005 | Ovshinsky et al. | |
| 2005/0191232 A1 | 9/2005 | Vajo et al. | |

OTHER PUBLICATIONS

Ronnebro et al., Calcium Borohydride for Hydrogen Storage, 2007, The journal of physical chemistry letters, 111, 12045-12047.*
Anton, D.L., Hydrogen desorption kinetics in transition metal modified NaAlH4, Journal of Alloys and Compounds, 2003, pp. 400-404, vol. 356-357.
Gross, et al., In-situ diffraction study of the decomposition of NaAlH4, Journal of Alloys and Compounds, 2000, pp. 270-281, vol. 297.
Gross, et al., The effects of titanium precursors on hydriding properties of alanates, Journal of Alloys and Compounds, 2003, pp. 423-428, vol. 356-357.
Haiduc, et al., On the fate of the Ti catalyst during hydrogen cycling of sodium alanate, Journal of Alloys and Compounds, 2005, pp. 252-263, vol. 393.
Jensen, et al., Development of catalytically enhanced sodium aluminum hydride as a hydrogen-storage material, Applied Physics A: Materials Science & Processing, 2001, pp. 213-219, vol. 72.

(Continued)

*Primary Examiner* — Jerry Lorengo
*Assistant Examiner* — Pritesh Darji
(74) *Attorney, Agent, or Firm* — Francis T. Coppa

(57) ABSTRACT

Disclosed herein is a composition comprising a complex hydride and a borohydride catalyst wherein the borohydride catalyst comprises a $BH_4$ group, and a group IV metal, a group V metal, or a combination of a group IV and a group V metal. Also disclosed herein are methods of making the composition.

6 Claims, 3 Drawing Sheets

OTHER PUBLICATIONS

Leon, et al., Chemical State of Ti atoms n NaAlH4 doped with a Ti-based precursor by ball milling, Journal of Metastable and Nanocrystalline Materials, 2005, pp. 319-322, vol. 24-25.

Wang, et al., Synergistic effects of co-dopants on the dehydrogenation kinetics of sodium aluminum hydride, Journal of Alloys and Compounds, 2005, pp. 245-255, vol. 391.

Zidan, et al., Hydrogen cycling behavior of zirconium and titanium-zirconium-doped sodium aluminum hydride, Journal of alloys and Compounds, 1999, pp. 119-122, vol. 285.

Soloveichik, G. L. et al.: Synthesis of titanium (III) monocyclopentadienyltetrahydroborates. In: Koord. Khim 1978, 4(8), 1216-22 (Russ.). In: CA vol. 89: 163706m.

* cited by examiner

HYDROGEN STORAGE MATERIAL AND RELATED PROCESSES

This application is a Continuation Application of application Ser. No. 12/031,336, filed on Feb. 14, 2008, now U.S. Pat. No. 7,754,641 which is hereby incorporated by reference in its entirety.

FEDERAL RESEARCH STATEMENT

This invention was made with Government support under Government contract no. DE-FC36-05GO15062 awarded by the U.S. Department of Energy to GE Global Research. The Government has certain rights in the invention.

BACKGROUND

While hydrogen has wide potential as a fuel, a major drawback in its utilization, especially in mobile uses such as the powering of vehicles, has been the lack of acceptable lightweight hydrogen storage medium. Certain materials and alloys in solid state have the ability to absorb and desorb hydrogen. These materials have been considered as a possible form of hydrogen-storage, due to their large hydrogen-storage capacity. Storage of hydrogen as a solid hydride can provide a greater volumetric storage density than storage as a compressed gas or a liquid in cryogenic tanks. Also, hydrogen storage in a solid hydride presents fewer safety problems than those caused by hydrogen stored in containers as a gas or a liquid. Solid-phase storage of hydrogen in a metal or alloy system works by absorbing hydrogen through the formation of a metal hydride under a specific temperature/pressure or electrochemical conditions, and releasing hydrogen by changing these conditions. Metal hydride systems have the advantage of high-density hydrogen-storage for long periods of time.

A desirable hydrogen storage material must have a high storage capacity relative to the weight of the material, a suitable desorption temperature/pressure, good absorption/desorption kinetics, and good reversibility.

A low hydrogen desorption temperature is desirable to reduce the amount of energy required to release the hydrogen from the material, as spending a great deal of energy to desorb hydrogen reduces the efficiency of the system. Furthermore, materials having relatively low hydrogen desorption temperature are necessary for efficient utilization of the available exhaust heat from vehicles, machinery, fuel cells, or other similar equipment.

Good reversibility is needed to enable the hydrogen storage material to be capable of repeated absorption-desorption cycles without significant loss of its hydrogen storage capabilities. Good absorption/desorption kinetics are necessary to enable hydrogen to be absorbed or desorbed in a relatively short period of time. For example, magnesium hydride has relatively high hydrogen storage capacity but the desorption kinetics of the magnesium hydride is less than desirable at room temperature. Even at higher temperatures it is difficult to desorb all of the hydrogen stored in hydride form. Therefore, it is necessary to find a material or family of materials that will store more hydrogen with good reversibility and improved absorption/desorption kinetics.

A family of complex aluminum hydrides such as $NaAlH_4$, $LiAlH_4$, and $Mg(AlH_4)_2$ have good theoretical reversible capacities. This family of complex aluminum hydrides are generally referred to as alanates. In practice, the reversibility of the alanates could not be achieved until recently when it was found that the addition of a small amount of a titanium catalyst made them reversible under certain conditions. However, doping with some titanium catalysts reduces the hydrogen storage capacities due to the presence of metal salt byproducts. Accordingly there is a desire for a hydrogen storage material with the advantageous features of the known alanate/titanium catalyst system but with greater hydrogen storage capacity. Additionally there is an ongoing need to reduce the temperature at which the absorption-desorption cycle takes place.

BRIEF DESCRIPTION

The afore mentioned need is overcome by a composition comprising a complex hydride and a borohydride catalyst wherein the borohydride catalyst comprises a $BH_4$ group and a group IV metal, group V metal, or a combination of a group IV and a group V metal.

Also disclosed herein are compositions comprising the reaction product of a complex hydride and a borohydride catalyst wherein the borohydride catalyst comprises a $BH_4$ group and a group IV metal, group V metal, or a combination of a group IV and a group V metal.

Also disclosed herein are methods of preparing the composition.

DETAILED DESCRIPTION

Figure 1:
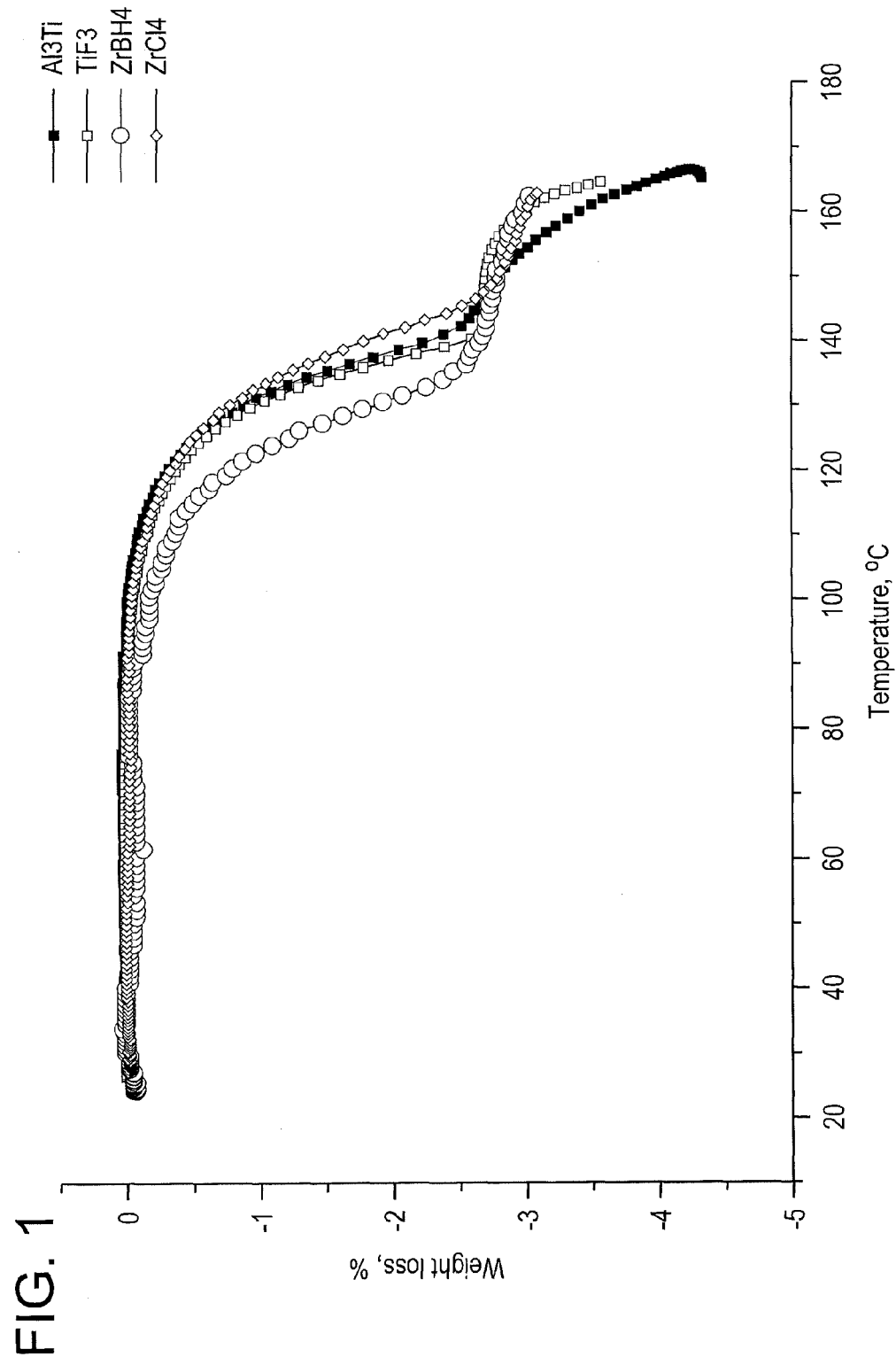
FIGS. 1-3 are graphs representing the data of the examples.

It was unexpectedly found that borohydrides comprising $BH_4$ groups, and a group IV metal, a group V metal or a combination thereof, and an optional organic ligand, e.g. cyclopentadienyl ligand, are even better catalysts for dehydrogenation and hydrogenation of hydrogen storage materials than traditional metal salts or metals and their alloys. When mixed with complex hydrides including aluminohydrides such as $NaAlH_4$, and boron hydrides, these catalysts effectively decrease dehydrogenation temperature and improve the hydrogenation and dehydrogenation kinetics of the complex hydrides. While the dehydrogenation temperature depends on the complex hydride, exemplary dehydrogenation temperatures for $NaAlH_4$ are about 50 to about 100° C., or, more specifically, about 60 to about 90° C.

Additionally, the use of borohydride catalysts in the dehydrogenation/hydrogenation of complex hydrides does not reduce the content of active material (hydrogen) because there is no exchange reaction as in the case of a metal halide catalyst (e.g. one mole of $TiCl_3$ consumes 3 moles of $NaAlH_4$ according to the reaction $TiCl_3 + 3\ NaAlH_4\ Ti + 3\ NaCl + 6H_2$). Borohydride catalysts have a low molecular weight and therefore the molar ratio of catalyst to complex hydride is higher than that for metal halides or other complexes, such as alkoxides. Due to the lower molecular weight of the $BH_4$ group compared to the atomic weight of the chlorine atom, the molar ratio of the catalyst to the complex hydride is also higher for borohydride catalysts at the same catalyst loading.

The borohydride catalyst can be effectively and efficiently dispersed in a hydrogen storage material comprising a complex hydride using a grinding technique. In addition, the borohydrides are easily soluble in organic solvents, e.g. ethers, which makes their dispersion in hydrogen storage material via dissolution followed by co-crystallization possible. For example the composition can be made by the evaporation and desolvation of a solution containing both a complex hydride and the catalyst.

Non-limiting examples of grinding techniques include ball milling, milling in a Wiley mill, hammer milling, rod milling, semi-autogenous (SAG) milling, autogenous milling, pebble milling, milling using high pressure grinding rolls, milling in a Buhrstone mill, or the like, or a combination comprising at least one of the foregoing grinding operations. Ball milling, using inert balls, is a preferred technique in some embodiments. Exemplary ball mills include rolling or planetary ball mills.

The ball mill, a type of grinder, is a device used to grind materials like ores, chemicals, ceramics and paints. The ball mill may rotate around a horizontal axis, a vertical axis, or an axis inclined between the horizontal and the vertical, partially filled with the material to be ground in addition to the grinding medium. An internal cascading effect reduces the reactants to a fine powder during the process. The grinding medium can be ceramic balls, or stainless steel balls coated with a ceramic. An exemplary ceramic is tungsten carbide. (It should be emphasized that other types of grinding media are also possible). Industrial ball mills that can operate continuously, with reactants fed at one end and products discharged at the other end, can also be used. The amount and size of balls, as well as size of the vessel, are selected to provide effective grinding of insoluble solids during the reaction. Rolling or planetary ball mills can be used for this purpose. The grinding produces shear forces, reduces particle size (to some extent), and creates friction and/or intimate contact between the surfaces of reactant particles. The surfaces of the reactants are refreshed, thus accelerating the reaction.

It is contemplated that the borohydride catalysts described herein may be catalyst precursors and may be converted into other borohydrides or hydrides during thermal decomposition. With that in mind the description of the composition as comprising the borohydride catalysts as described herein is also intended to include the reaction products of the complex hydride and borohydride catalyst after thermal decomposition, as well as products of thermal decomposition of the borohydride catalyst.

Complex hydrides include alanates and metal borohydrides. Alkali metal alanates are of the general formula:

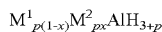

wherein $M^1$ can be sodium or potassium, $M^2$ can be lithium or potassium, $0 \leq x \leq$ about 0.8, and $1 \leq p \leq 3$. Specific alanates include sodium alanate, potassium alanate, mixed sodium-lithium alanate, mixed sodium-potassium alanate, and mixed potassium-lithium alanate. In one embodiment the complex hydride comprises sodium alanate. In one embodiment the complex hydride comprises magnesium alanate. In one embodiment the complex hydride comprises calcium alanate.

Boron hydrides include metal borohydrides, boranes, polyhedral boranes, and anions of borohydrides or polyhedral boranes. Suitable boron hydrides include, without intended limitation, neutral borane compounds such as decaborane (14) ($B_{10}H_{14}$); ammonia borane compounds of formula $NH_x$-$BH_y$ and $NH_xRBH_y$, wherein x and y independently equal 1 to 4 and do not have to be the same, and R is a methyl or ethyl group; borazane ($NH_3BH_3$); borohydride salts ($M(BH_4)_n$), triborohydride salts ($M(B_3H_8)_n$), decahydrodecaborate salts ($M_2(B_{10}H_{10})_n$), tridecahydrodecaborate salts ($M(B_{10}H_{13})_n$), dodecahydrododecaborate salts ($M_2(B_{12}H_{12})_n$), and octadecahydroicosaborate salts ($M_2(B_{20}H_{18})_n$), where M is a cation selected from the group consisting of alkali metal cations, alkaline earth metal cations, aluminum cation, zinc cation, and ammonium cation, and n is equal to the charge of the cation. In some embodiments M is sodium, potassium, lithium, or calcium. In some embodiments the metal borohydride is $Mg(BH_4)_2$. The boron hydride fuels may contain a stabilizer component, such as a metal hydroxide having the general formula $M(OH)_n$, wherein M is a cation selected from the group consisting of alkali metal cations such as sodium, potassium or lithium, alkaline earth metal cations such as calcium, aluminum cation, and ammonium cation, and n is equal to the charge of the cation. As understood by one of ordinary skill in the art the metal borohydride used as a complex hydride does not comprise a group IV or group V metal.

The complex hydride may be present in an amount of about 75 to about 99 weight percent, based on the combined weight of the complex hydride and the borohydride catalyst. Within this range the complex hydride may be present in an amount greater than or equal to about 80 weight percent, or more specifically greater than or equal to about 85 weight percent. Also within this range the complex hydride may be present in an amount less than or equal to about 95 weight percent.

The borohydride catalyst comprises a $BH_4$ group and a group IV metal, a group V metal or a combination thereof. The borohydride catalyst may also comprise an optional organic ligand, e.g. a cyclopentadienyl ligand. In some embodiments the borohydride catalyst may also comprise a halide ligand. In some embodiments the metal is selected from the group consisting of titanium, zirconium or combinations thereof. Organic ligands include cyclopentadienyl, as mentioned above, as well as neutral ligands such as phosphines, amines, ethers and combinations thereof. The borohydride catalyst can be made via an exchange reaction. A halogenated metal complex is reacted with alkali metal borohydride and optionally alkali metal aluminohydride in a non coordinating or mildly coordinating solvent such as ether. While the precise formula of the resulting borohydride catalyst in some cases is not known it is hypothesized that the resulting borohydride complex has the general formula $M'_kM(BH_4)_nCp'_mCl_p$ where M=Ti, Zr, M'=Li, Cp'=cyclopentadienyl $C_5H_5$ or its alkyl substituted, k=0 to 1, n=1 to 3, m=0, 1, 2, p=0 to 2, and (n+m+p-k)=3 (when M=Ti, Zr) or 4 (when M=Zr) when the catalyst comprises a cyclopentadienyl ligand and $M'_kM(BH_4)_nL_mCl_p$ where M=Ti, Zr, M'=Li, L=phosphine, amine or ether ligand, k=0 to 1, n=1 to 3, m=0, 1, 2, p=0 to 2, and (m+p-k)=3 (when M=Ti, Zr) or 4 (when M=Zr) when the catalyst comprises a neutral ligand.

In some embodiments the borohydride catalyst comprises bis(cyclopentadienyl) titanium borohydride ($Cp_2TiBH_4$). In some embodiments the borohydride catalyst comprises CpTi$(BH_4)_{2-x}Cl_x$ where x=0, 1.

The borohydride catalyst is present in an amount of about 1 to about 25 weight percent based on the combined weight of the complex hydride and the borohydride catalyst. Within this range the borohydride catalyst is present in an amount greater than or equal to about 5 weight percent. Also within this range the borohydride catalyst is present in an amount less than or equal to about 20 weight percent, or, more specifically, less than or equal to about 15 weight percent.

In some embodiments the molar ratio of the borohydride catalyst to complex hydride is 1:2 to 1:45, or more specifically, 1:4 to 1:10.

The hydrogen storage materials may be prepared by grinding of the complex hydride in an inert atmosphere with the borohydride catalyst. In some embodiments, the mixture is milled in a ball mill for about 30 minutes to about an hour. The length of time and preparation conditions may vary with the type of mechanical milling. The milling takes place in an inert atmosphere to prevent oxidation of the complex hydride, which may be pyrophoric in the presence of oxygen. Any inert gas such as nitrogen, helium, or argon may be used to provide the inert atmosphere.

The hydrogen storage materials may also be prepared by using solution based techniques where the complex hydride and the borohydride catalyst are suspended or dissolved in an organic solvent, mixed, and the solvent evaporated. In one embodiment the solvent comprises diethyl ether. Mixing may be achieved using stirring, ultrasonic mixing, or grinding (as described above).

EXAMPLES

Magnesium borohydride synthesis. A stainless steel pipe mill was charged with a 3:1 mixture molar ratio of $NaBH_4$ and $MgCl_2$ in anhydrous diethyl ether and 50 stainless steel balls, each weighing 10 grams, under an argon atmosphere. The mill was mechanically rolled for 3-5 days at 100-300 rotations per minute (rpm). The reaction mixture was transferred into a flask in a glove box, and filtered under vacuum to remove insoluble products and unreacted starting materials. The solvent was evaporated off at room temperature and the resulting solid was heated to 235° C. for 2 hours. The white solid material was ground into a fine powder and then re-heated to 235° C. for 2 additional hours.

Catalyst synthesis. Catalysts were synthesized by exchange reaction of the related chloride with lithium borohydride in ether. A typical procedure is as follows. 1.5 to 2 grams (g) of a titanium or zirconium chloride complex was reacted with a calculated amount of lithium borohydride and, if needed, lithium aluminohydride in 150 milliliters (ml) anhydrous diethyl ether under stirring. After several hours the reaction mixture was filtered and the solvent was evaporated from the filtrate. The solid residue was dried in vacuum for several hours at room temperature. The molar ratios of reagents are presented in Table 1. $Cp_2TiBH_4$ and $CpTi(BH_4)_2$ were synthesized according literature procedures (Lucas, C. R., Bis(h5-cyclopentadienyl)[tetrahydroborato(1-)]titanium. *Inorganic Syntheses* 1977, 17, 91-4; Soloveichik, G. L.; Bulychev, B. M.; Semenenko, K. N., Synthesis of titanium(III) monocyclopentadienyltetrahydroborates. *Koordinatsionnaya Khimiya* 1978, 4, (8), 1216-22). In the case of $Ti(BH_4)_3$, an excess of $LiBH_4$ was used for stabilization of this unstable complex. For zirconium(III) borohydrides, one equivalent of $LiAlH_4$ was used to reduce Zr(IV) to Zr(III).

TABLE 1

| | Metal complex | | Metal |
| --- | --- | --- | --- |
| | Formula | millimoles (mmol) | complex:$LiBH_4$:$LiAlH_4$ molar ratio |
| Example 1 | $TiCl_3$ | 13.0 | 1:5 |
| Example 2 | $CpTiCl_3$ | 9.1 | 1:3 |
| Example 3 | $Cp_2TiCl_2$ | 8.0 | 1:2 |
| Example 4 | $ZrCl_4$ | 6.5 | 1:3:1 |
| Example 5 | $Cp_2ZrCl_2$ | 6.9 | 1:2:1 |

Doping of hydride storage materials. Catalyst doping consisted of adding select catalysts in an amount of 10 weight percent, based on the combined weight of the catalyst and $Mg(BH_4)_2$, to 1 to 5 g of $Mg(BH_4)_2$, which was then sealed in a tungsten carbide milling bowl with 10 tungsten carbide balls, each weighing 10 grams, in an argon atmosphere. The mixture was milled in a Fritsch P5 planetary ball mill overnight at 200 rpm. All materials were handled in an argon glove box filled with ultra pure argon.

Figure 2:
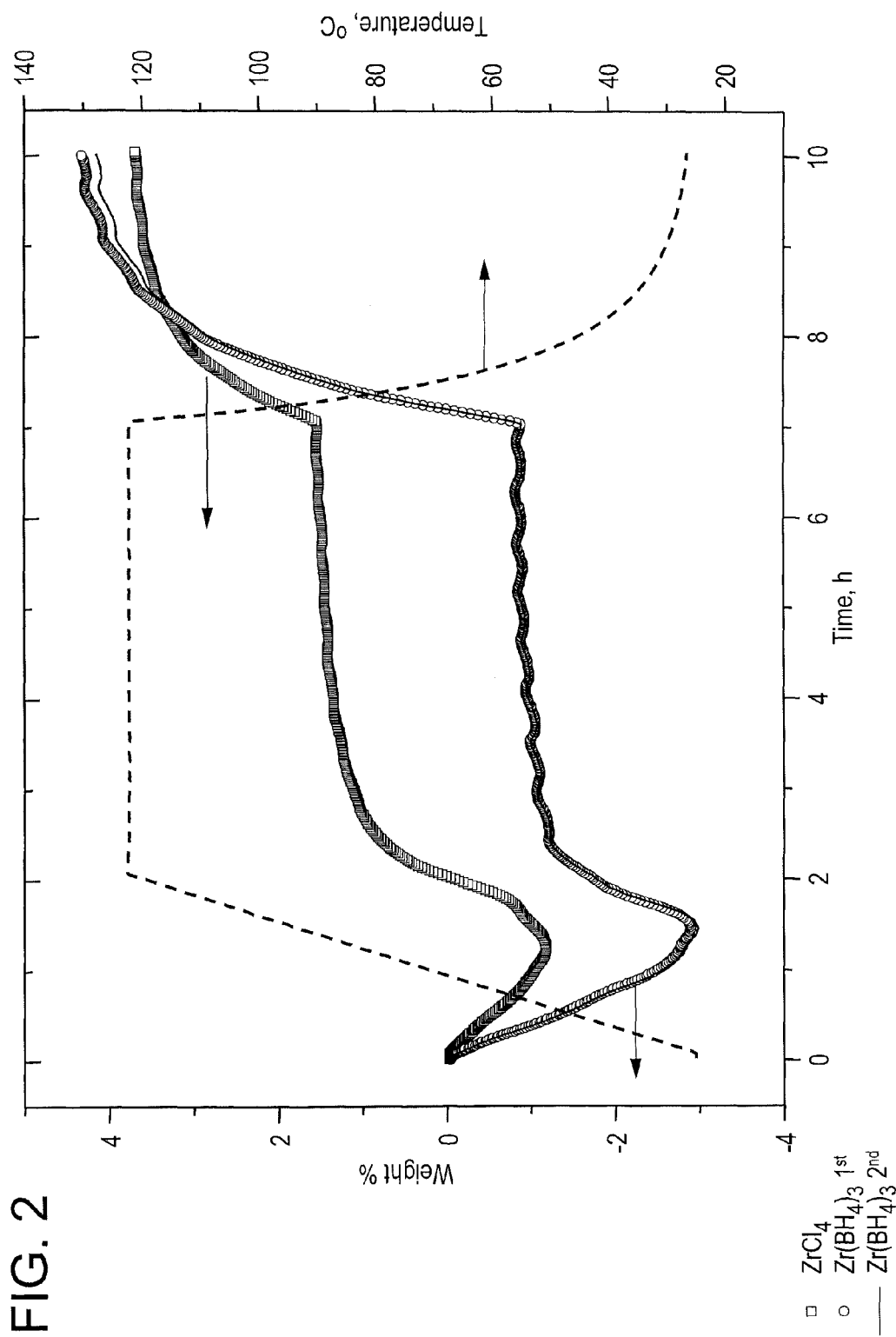

Material testing. Temperature programmed desorption (TPD) experiments were performed in a Sieverts' type apparatus (PCTPro-2000 by Hy-Energy Scientific Instruments, LLC). Approximately 200 milligrams (mg) of doped $NaAlH_4$ was heated to 250° C. at a rate of 1° C./min in a known volume initially under vacuum. The pressure generated by the release of hydrogen was then converted to $H_2$ weight percent. The dehydrogenated sample was recharged under 860 psi (5.9 mega Pascals (MPa)) $H_2$ at 80-120° C. for up to 60 hrs. Results for dehydrogenation are presented in FIG. 1. Results for hydrogenation (recharging) are presented in FIG. 2.

It is clear that zirconium borohydride catalyst allows lower temperature for both dehydrogenation (FIG. 1) and rehydrogenation (FIG. 2) in comparison with $ZrCl_4$ and other catalysts for sodium alanate. It is possible to recharge sodium alanate at temperatures as low as 80° C.

Figure 3:
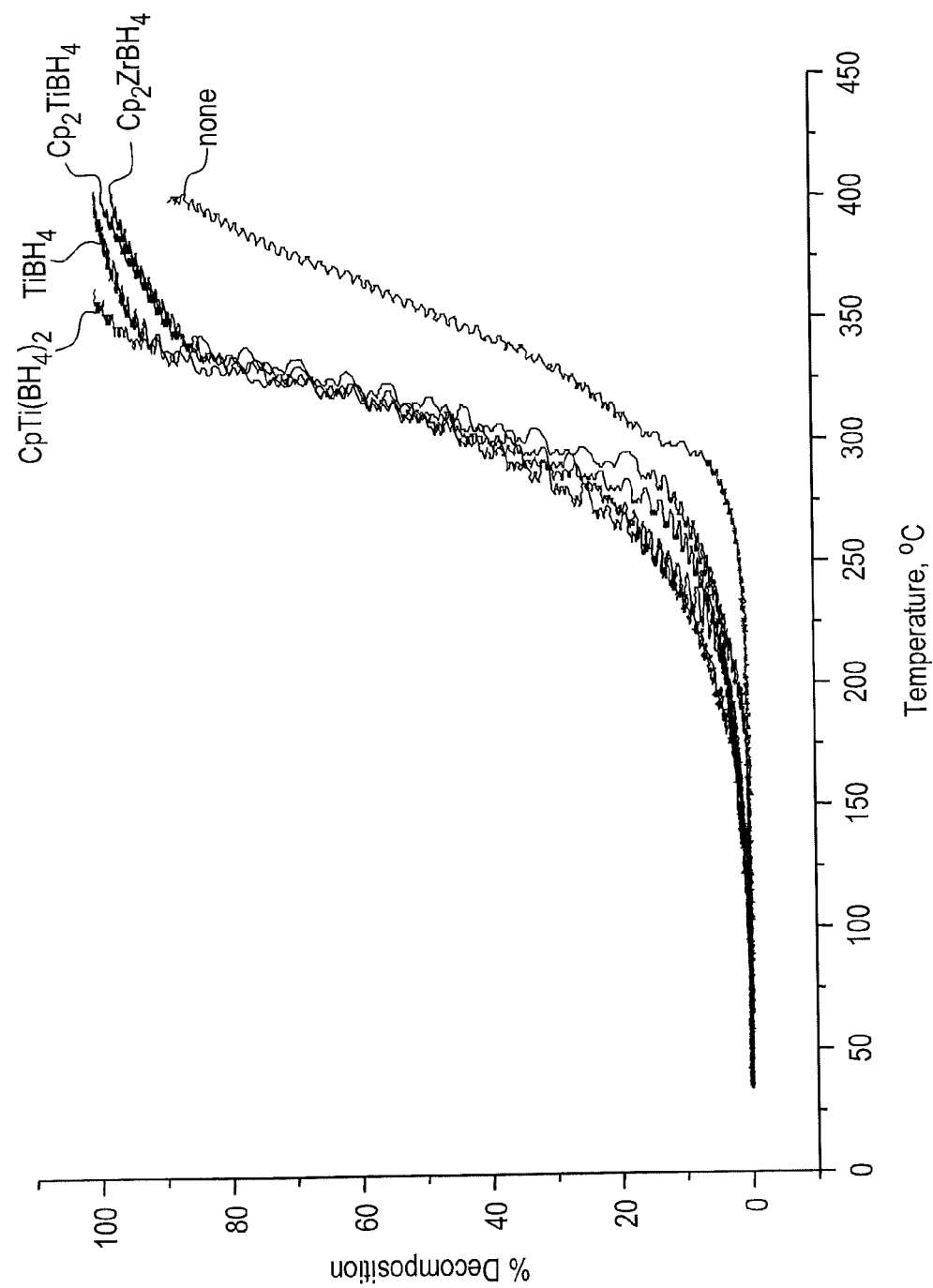

Doped magnesium borohydride samples were tested in a 6 pack of small stainless steel autoclaves equipped with pressure transducers. The 250 to 300 milligram (mg) samples were heated to 360° C. with rate of 1.5° C./min. Results are presented in FIG. 3. Addition of titanium and zirconium complexes to magnesium borohydride effectively decreased its decomposition temperature by 50-70° C.

In the specification and the claims, reference is be made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. All ranges disclosed herein are inclusive of the endpoints, and the endpoints are independently combinable with each other.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The invention claimed is:

1. A hydrogen storage composition consisting essentially of a complex hydride and a borohydride catalyst,
   wherein the borohydride catalyst comprises a $BH_4$ group and a metal selected from the group consisting of titanium, zirconium and combinations thereof, and
   wherein the complex hydride includes a metal borohydride compound selected from the group consisting of borohydride salts ($M(BH_4)_n$), triborohydride salts ($M(B_3H_8)_n$), decahydrodecaborate salts ($M_2(B_{10}H_{10})_n$), tridecahydrodecaborate salts ($M(B_{10}H_{13})_n$), dodecahydrododecaborate salts ($M_2(B_{12}H_{12})_n$), and octadecahydroicosaborate salts ($M_2(B_{20}H_{18})_n$), where M is a cation selected from the group consisting of alkali metal cations, alkaline earth metal cations, aluminum cation, zinc cation, and ammonium cation, and n is equal to the charge of the cation; and
   wherein the borohydride catalyst further comprises a cyclopentadienyl group, a halide, or combinations thereof.

2. The composition of claim 1, wherein the complex hydride is present in an amount of about 75 to about 99 weight percent, and the borohydride catalyst is present in an amount of about 1 to about 25 weight percent, wherein the weight percents are based on the combined weight of the complex hydride and the borohydride catalyst.

3. The composition of claim 1, wherein the complex hydride comprises $Mg(BH_4)_2$.

4. The composition of claim 1, wherein the borohydride catalyst comprises bis(cyclopentadienyl) titanium borohydride.

5. The composition of claim 1, wherein the borohydride catalyst comprises $CpTi(BH_4)_{2-x}Cl_x$, where x=0, 1; and wherein Cp is at least one cyclopentadienyl group.

6. The composition of claim 1, wherein the complex hydride comprises $Li(BH_4)$ or $Ca(BH_4)_2$.

* * * * *